United States Patent [19]

Mohler

[11] 4,190,832
[45] Feb. 26, 1980

[54] POLARIZED WINDSHIELD INDICIA REFLECTION DISPLAY SYSTEM

[76] Inventor: Sailor Mohler, 5410 Lightning View, Columbia, Md. 21044

[21] Appl. No.: 897,251

[22] Filed: Apr. 18, 1978

[51] Int. Cl.² .................................................. G09F 9/32
[52] U.S. Cl. .................................. 340/705; 340/52 R; 340/97; 340/107; 350/337
[58] Field of Search .............. 340/324 R, 324 M, 336, 340/52 R, 97, 107, 135, 705, 765, 784; 350/330, 337

[56] References Cited

U.S. PATENT DOCUMENTS

| | | | |
|---|---|---|---|
| T936,004 | 7/1975 | Willis | 340/324 M |
| 3,317,906 | 5/1967 | Baldridge | 340/97 |
| 3,665,392 | 5/1972 | Annas | 340/97 |
| 3,911,426 | 10/1975 | Mouton et al. | 340/336 |

Primary Examiner—Marshall M. Curtis
Attorney, Agent, or Firm—Morton J. Rosenberg

[57] ABSTRACT

A windshield indicia display system utilizing a liquid crystal display in conjunction with a polarizing filter element and semi-transparent reflective tape element to form a unique optical system capable of projecting in digital format a virtual image into the visual field of the operator. This virtual image, focused at infinity, utilizes the unmodified windshield as a remote polarizer for this unique optical system. Electronic means are provided to convert vehicle speed or other indicia into a decimal format capable of digital display by the system.

17 Claims, 5 Drawing Figures

POLARIZED WINDSHIELD INDICIA REFLECTION DISPLAY SYSTEM

BACKGROUND OF THE INVENTION

1. Field Of the Invention

The present invention relates to heads up display devices for moving vehicles such as automobiles and airplanes and particularly to such devices utilizing the vehicle's windshield to reflect an image to the observer.

It has long been recognized that the optimum display to the operator of a moving vehicle would be one which did not require the operator to shift his eyes from the external scene to observe his instrumentation. Such displays minimize the amount of time required for the operator to refocus his vision from one field to another and maximize his perceptability of the instrumentation. Optimum devices for this purpose have long been sought.

Existing devices directed to solving this problem employ high intensity light sources which generate light in the form of alpha-numeric characters to be displayed and reflect this high intensity light off of the vehicle's windshield, or a separate screen provided for that specific purpose. The problem associated with such methods is that ambient light external to the windshield is often brighter than the light source within the vehicle, thereby preventing or impairing the visibility of the display. Because of the extremely high intensity of light source required to overcome external ambient light levels, existing devices are impractical or inoperative under many conditions.

SUMMARY OF THE INVENTION

Accordingly, the present invention provides a windshield indicia display system that operates effectively under all light conditions, including high level external light by utilizing a liquid crystal display and polarizing techniques.

A photo-optical transducer coupled to the speedometer cable of a motor vehicle produces a stream of pulses, the repetition rate of which is proportional to the vehicle's speed. A stable oscillator provides master clock pulses which are divided in frequency and used to trigger a gating network. The gating network, triggered for a regulated time period, allows the pulse stream generated by the transducer to be counted in order to establish vehicle speed. These pulses are assembled into binary coded decimal format and transmitted to decoder/driver circuits. These circuits drive individual segments of a liquid crystal display forming part of a liquid crystal display optical system.

The liquid crystal display is positioned below the windshield onto which vehicle speed is ultimately to be projected. Positioned below this display is a polarizing filter element and below this filtering element is a semi-transparent reflective tape element. Ambient light passing through the windshield and incident upon the liquid crystal display will pass through the display, the filtering element, and the semi-transparent reflective tape element. Light reflected from the tape again passes through the filtering element and the liquid crystal display and impinges upon the windshield. Various segments of the liquid crystal display are energized in accordance with the indicia to be displayed. The optical system utilizes a polarization rotational twist that occurs for all light passing through unenergized segments, in combination with the polarizing filtering element to filter out all light other than light polarized in the plane of the windshield and corresponding to the numerals carrying desired indicia. This system projects a virtual image into the field of the observer that is independent of the ambient light conditions external to the windshield by utilizing the windshield as a remote polarizer.

It is therefore an object of the present invention to provide a windshield indicia projection system.

A further object of the present invention is to provide a windshield indicia projection system that will function under all ambient light conditions.

Another object of the present invention is to provide a windshield indicia projection system utilizing a liquid crystal display.

Still another object of the present invention is to provide a windshield indicia projection system utilizing the windshield of a vehicle as a remote polarizer.

Yet another object of the present invention is to provide a windshield indicia projection system that is relatively inexpensive to produce and can be utilized to project a variety of indicia.

A still further object of the present invention is to provide a windshield indicia display system capable of presenting information in decimal format.

Another object of the present invention is to provide a windshield indicia display system that minimizes parallax effects and projects a virtual image, focused at infinity and situated directly in the visual field of the observer.

Yet another object of the present invention is to provide a windshield indicia display system capable of electronically converting vehicle speed into digital format.

A further object of the present invention is to provide a windshield indicia display system that is easily calibrated for installation into any vehicle.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings wherein:

DESCRIPTION OF THE PREFERRED EMBODIMENT

The broad objective of this windshield indicia display system is to place information such as the speed of a vehicle, capable of being put into digital format, directly into the visual field of the operator. In this manner, the operator does not have to constantly look down at his speedometer, nor does he have to worry about forgetting to look at it.

Figure 1:
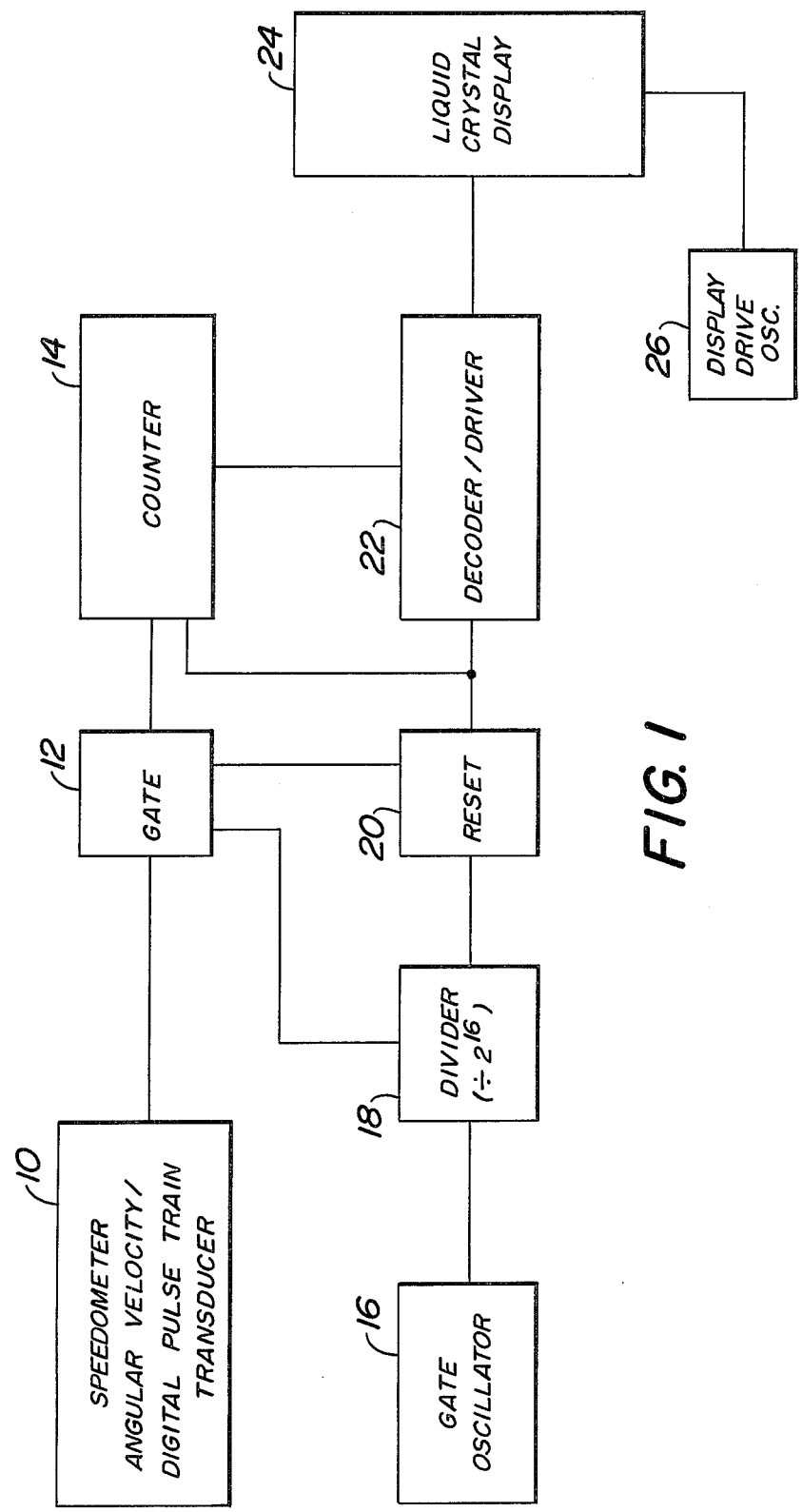
FIG. 1 is a functional block diagram of the windshield indicia display system according to the present invention.

FIG. 1 is a functional block diagram of the windshield indicia display system according to the present invention. The heart of the system is a multi-segment liquid crystal display optical system 24, illustrated in detail in FIG. 3. The remaining blocks of FIG. 1 provide the means for electrically energizing appropriate segments of optical system 24 so that vehicle speed can be digitally displayed upon the windshield.

The speed of the vehicle is first translated into a stream of digital pulses by a speedometer angular velocity/digital pulse train transducer 10. Transducer 10 is a 1¼″ diameter wheel having ten slots about its periphery. This wheel is positively coupled to the vehicle's speedometer cable so that its angular rate will be a function of the vehicle speed. This wheel is positioned so that its periphery and slots interrupt the photo-optic path of an optical encoder. In this manner, a stream of digital pulses is generated proportional to the rate at which the slots interrupt the optical path. This pulse stream will have a repetition rate that is proportional to the vehicle's speed. Such optical encoders are well-known and the use of any number of them would be acceptable in the practice of this invention. One such device, used successfully, is the Texas Instruments XL145 optical encoder. This particular unit uses a light source and an optical transistor. The slotted wheel coupled to the speedometer cable is positioned to interrupt the light path of the XL145 and a pulse train having a repetition rate proportional to the speed of the vehicle is produced. By using a wheel having ten slots cut in its periphery spaced at 36° intervals, the windshield indicia display system according to this invention, produces a digital display of vehicle speed that is continuously accurate to within three miles per hour during a zero to sixty mile per hour acceleration during an interval of ten seconds. If more reliable and precise measuring is required, the number of such wheel slots can be increased to thirty six, speed at 10° intervals. After modifying the electronics to count the additional pulses produced, the windshield indicia display system can produce a digital representation of vehicle speed that is accurate to within one mile per hour and is updated each second during a zero to sixty mile per hour acceleration over a ten second time span.

The pulses produced by transducer 10 are counted and coded for ultimate display optical system 24.

An oscillator 16 produces a stream of high frequency clock pulses at a repetition rate of 42–44 khz. The output of oscillator 16 is coupled to a divider 18 which divides these high frequency clock pulses by $2^{16}$, producing a 50% duty cycle pulse train having a period of 1.46 seconds. Divider 18 has two identical outputs each carrying this 50% duty cycle pulse train.

One of these outputs of divider 18 is coupled to a gate network 12. The pulse train output of transducer 10 is coupled to a second input of gate network 12. By utilizing the clock pulses from divider 18, gate network 12 acts as a window which is open for 0.73 seconds. When this window is open, pulses produced by transducer 10 flow through gate network 12 and are coupled to a counter 14. In this manner, pulses are allowed to flow into counter 14 for a predetermined length of time, based upon the frequency of oscillator 16 and the action of divider 18. This system of oscillating, dividing, and gating the pulses produced by transducer 10, rather than counting these pulses directly, allows the system to be finely tuned for any given automobile and speedometer system. By finely tuning the frequency of oscillator 16 for a particular installation, the system can be easily calibrated to produce an accurate display. In production models, the frequency of oscillator 16 will be variable by a screwdriver adjustment so that the operator can coordinate its frequency to give an accurate display coincident with his actual speed according to mile markers along the highway. The use of a high frequency oscillator 16 coupled to divider 18 enhances the versatility of the system. Oscillation frequency fluctuations and irregularities are divided by $2^{16}$, thereby producing a very accurate gating window. In summary, the action of oscillator 16 and divider 18 which are coupled to gate network 12 along with the output of transducer 10 produces a stream of pulses at the output of the gate network proportional to the speedometer angular rate sensed by the transducer.

By using a wheel having ten slots equally spaced at 36° intervals and by having the frequency of oscillator 16 properly calibrated, the number of pulses at the output of gate network 12 during each window will correspond to the speed of the vehicle in miles per hour. For example, a vehicle going 55 m.p.h. will produce at the output of gate network 12 a stream of 55 pulses during each 0.73 second gate window. This system of pulses corresponding to vehicle speed at the output of gate network 12 is coupled directly to digital counter 14. The sole function of counter 14 is to count the pulses from gate network 12. When counter 14 has finished counting a pulse train from gate network 12, the information is available in binary coded decimal form. A binary code corresponding to the value of each digit is presented at the output of counter 14 and is coupled to a decoder/driver 22. Decoder/driver 22 sorts out the binary coded digital format from counter 14 and produces a driver signal which, when applied to the segments of a liquid crystal display 80 (part of liquid crystal display optical system 24), energize the appropriate segments to form a decimal numeral. Due to their physical properties and modes of operation, liquid crystal displays require a constant source of display drive oscillations. These are provided by a display drive oscillator 26. The liquid crystal display 80 selected for this system according to the present invention, is an HH&E type #5740. This readily available display is specially modified as detailed in FIG. 3 to produce liquid crystal display optical system 24.

A reset network 20 allows indicia information that has been already counted and displayed to be reset, thereby allowing the system to update periodically. In this manner, the display will change to accomodate vehicle speed changes. Gate network 12 allows pulses from transducer 10 to pass through to counter 14 only for a period of 0.73 seconds. This occurs during half of the total duty cycle of 1.46 seconds of the pulse train coupled from divider 18 to gate network 12. After transducer pulses have been gated by gate network 12 and counted by counter 14, they are latched into decoder/driver 22. Reset network 20 generates a reset pulse five oscillator counts after the 0.73 second gate window has closed (approximately 1/10th of a second later). This slight delay insures that pulses from gate network 12 have had sufficient time to be strobed into counter 14, counted, and coupled to and latched into decoder/driver 22. The reset pulse generated by reset network 20 is coupled to gate network 12, counter 14, and decoder/driver 22 simultaneously. Reset network 20 produces this reset pulse five cycles after the lapse of the 0.73 second gate window in response to a pulse generated by divider 18 and coupled to reset network 20. In essence, the reset pulse is generated by divider 18 and delayed by reset network 20.

Once the number of pulses eminating from gate network 12 have been counted by counter 14 and latched into decoder/driver 22, the reset pulse allows gate network 12 to pass a new stream of pulses to counter 14. Thus, time is not wasted during display of the numerals corresponding to pulses previously counted. While pulses are being displayed numerically by liquid crystal display optical system 24, a new stream of pulses is being gated by gate network 12 to counter 14 in response to a reset pulse from reset network 20. This system of reset pulses coupled to gate network 12, counter 14, and decoder/driver 22 allow for regular update of vehicle speed information thereby enhancing the accuracy of the entire system.

Figure 2A:
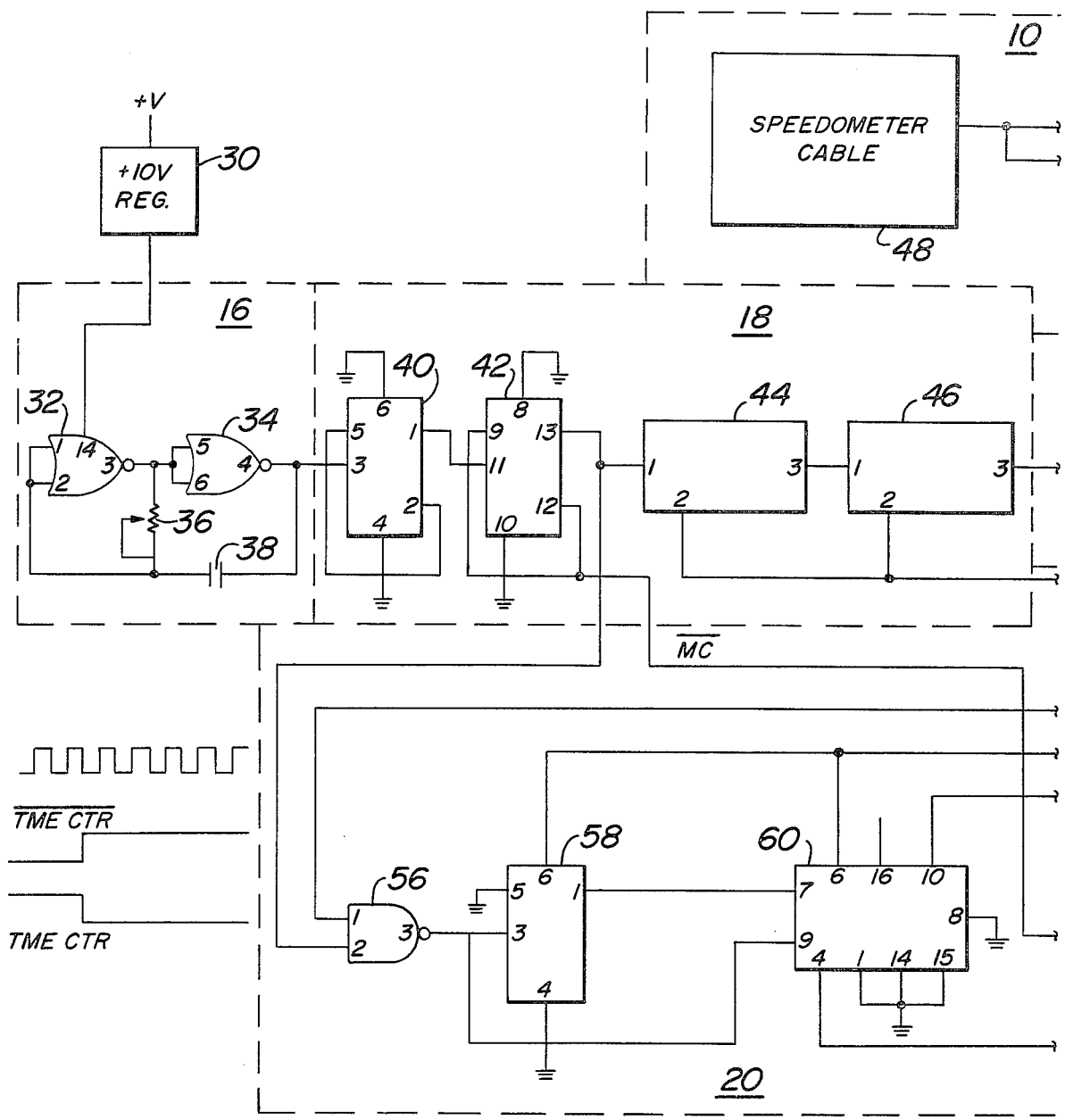
FIGS. 2A and 2B are a detailed schematic diagram of the electrical portions of the windshield indicia display system according to the present invention.
Figure 2B:
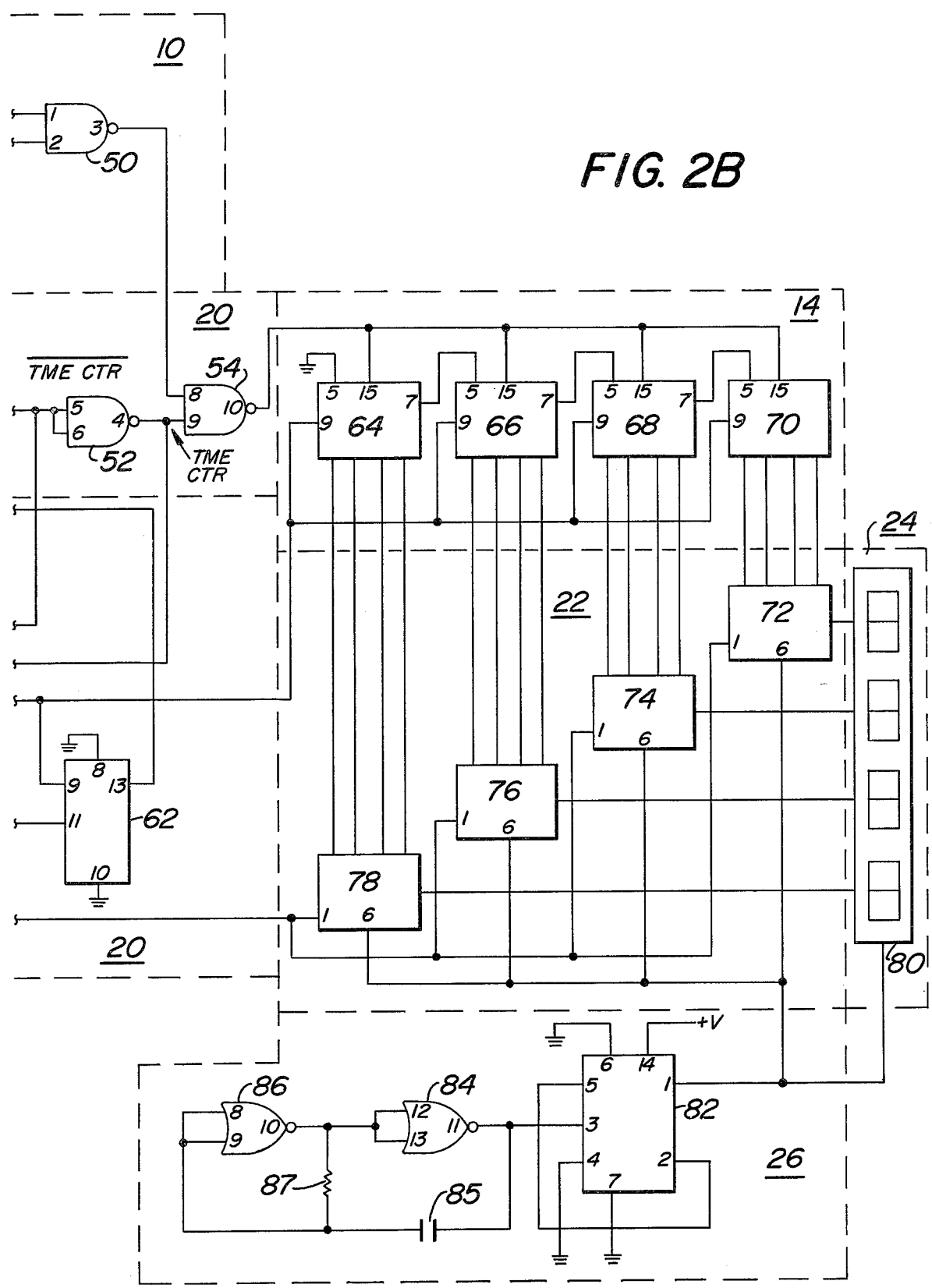

The detailed schematic diagram of the electrical portions of the windshield indicia display system are detailed in FIGS. 2A & 2B. Referring now to FIGS. 2A & 2B, the only electrical element that is not shown on FIG. 1 is a ten volt regulator 30 which serves only a power supply function. CMOS logic elements were selected to implement the functional block diagram of FIG. 1 and regulator 30 is provided to power these logic elements with little fluctuation in volume. Regulator 30 acts as a filter to the fluctuating voltages available from most automobile systems ranging from twelve to fifteen volts. The regulation provided by regulator 30 is most important to the function of oscillator 16, because the function of a CMOS oscillator is severely influenced by power supply variations and transients. Oscillator 16 includes two CMOS gates 32 and 34 coupled in feedback arrangement. The output of gate 32 is coupled to the inputs of gate 34. The output of gate 34 is coupled by a capacitor 38 to the inputs of gate 32. A variable resistor 36 couples the inputs of gate 32 to its output and to the inputs of gate 34. By adjusting the value of resistor 36, oscillation frequency is controlled. Normally, resistor 36 can be varied by a screwdriver adjustment. Power is supplied to gate 32 from regulator 30 via pin 14. No other power supply connections are shown in FIGS. 2A & 2B, however, power is supplied to all active circuit elements from this regulator. An operating frequency of 42 to 44 kilohertz was selected for oscillator 16 to insure sufficient time for liquid crystal display 23 to be activated after each indicia update and to allow for a clock pulse period of greater than one second after division by $2^{16}$ in divider 18.

The output of oscillator 16 is taken from pin 4 of gate 34 and is coupled directly to a divide by two counter 40 which is a part of divider 18. Divider 18 includes divide by two counter 40, a second divide by two counter 42, a divide by $2^7$ counter 44, and a second divide by $2^7$ counter 46. The output of counter 40 at pin 1 is coupled to input pin 11 of counter 42. The divided output of counter 42 at its pin 13 is coupled directly to input pin 1 of counter 44. Output pin 3 of gate 44 is coupled directly to input pin 1 of counter 46. In combination, counters 40, 42, 44, and 46 electrically connected in this fashion function as a $2^{16}$ divider, having inputs at pin 3 of counter 40 and output at pin 3 of counter 46. The particular combination of counters selected is not critical, so long as the overall dividing function is by $2^{16}$. There are many varieties and combinations of integrated circuit chips available to accomplish this purpose. An output tap-off from pin 13 of counter 42 is completed to reset network 20. This particular output to reset network 20 is the frequency of oscillator 16 divided by four. There are, of course, other logic designs which will allow a divide by four tap-off from divider 18 to be used by reset network 20. The stream of pulses from output pin 13 of counter 42 is utilized by reset network 20 to create reset pulses. At output pin 3 of counter 46, there is a 50% duty cycle pulse train having a period of 1.46 seconds. This signal is at a high logic level 50% of the time, and at a low logic level during the other 50%. It is the low logic level that is utilized by gate network 12. Gate network 12 includes gates 52 and 54. Both inputs (pins 5 and 6) of gate 52 are tied together to form the input to gate network 12. The output of gate 52 at pin 4 is coupled to input pin 9 of gate 54. Pulses from transducer 10 are coupled to input pin 8 of gate 54. Output pin 10 of gate 54 serves as the output for gate network 12 and is coupled to counter 14. Reset pulses from reset network 20 are applied to input pin 9 of gate 54 along with the output of gate 52.

As previously stated, it is the low logic level portion of the signal from divider 18 that activates gate 12. This occurs because gate 52 inverts. Note that the output of divider 18 from pin 3 of counter 46 is coupled not only to gate network 12, but also to one of two inputs on gate 56 which is part of reset network 20. When this output signal from counter 46 is at a high logic level, there will be a pulse at the output pin 4 and gate 52 which is 0.73 seconds in duration. In order for the proper logic function to occur in reset network 20, it is important to detect when the output of gate 56 becomes logic level 1, for this enables the gate output. Reset network 20 includes an input gate 56 having inputs at pins 1 and 2. As previously stated, pin 1 of gate 56 is coupled to the output of divider 18, taken at pin 3 of counter 46. Input to pin 2 of gate 56 is coupled to output pin 13 of the second divide by two counter of divider 18, taken at pin 13 of counter 42. Thus, the oscillator signal divided by four is applied to input pin 2 of gate 56 and the oscillator frequency divided by $2^{16}$ is applied to input pin 1. Output at pin 3 of gate 56 is coupled to both input pin 3 of a clocked set reset flip-flop 58 and to input pin 9 of a four bit shift register 60. Output pin 1 of gate 58 is coupled to input pin 7 of shift register 60.

Gate 56 is enabled by the output of divider 18 taken from counter 46 going to a high logic level. Input to pin 2 of gate 56 acts as a setting pin and is presented with a continuous pulse train that is not gated. Whenever input pin 1 of gate 56 is at a logic level 1, the output of gate 56 taken at pin 3 will be a pulse train. This output pulse train at pin 3 of gate 56 is coupled directly to clocked set reset flip-flop 58 which is normally at a low logic state. The first pulse to reach flip-flop 58 from gate 56 clocks this flip-flop and sets its output at pin 1 to a high logic level. This output at pin 1 of flip-flop 58 is coupled to shift register 60. The first pulse at the output of register 60 will occur two clocks after its input after the output of flip-flop 58 has reached a high logic level. This shift register output occurs at pin 4 and is referred to as the display driver strobe (DDSTR). This DDSTR signal is coupled to decoder/driver 22.

Transducer 10 is depicted as a combination of a commercial transducer element 48 coupled to a buffer inverter gate 50. The output of transducer 10 is taken as the output of gate 50 at pin 3 and is coupled to input pin 8 of gate 54 in gate network 12. As gate network 12 is enabled by divider 18 and reset pulses from reset network 20, pulses from transducer 10 flow through gate 54 into counter 14. Counter 14 includes counter chips 64, 66, 68, and 70, each being a 4510 chip. Data from gate network 12 is applied to pin 15 of each of these counter chips. Decoder/driver 22 includes four decoder/driver chips 78, 76, 74, and 72, each being a CD4056. Each of these decoder/driver chips is associated with one counter clip of counter 14. Decoder/driver chip 78 is coupled via four data lines to counter chip 64, decoder/driver chip 76 is coupled via four data lines to counter chip 66, decoder/driver chip 74 is coupled via four data lines to counter chip 68, and decoder/driver chip 72 is coupled via four data lines to counter chip 70. In addition, the outputs of decoder/driver chips 78, 76, 74 and 72 are coupled one each to a particular numeral of a multi-segment liquid crystal display 80. Liquid crystal display 80 forms an integral part of liquid crystal display optical system 24 detailed in FIG. 3.

Returning again to the process by which data related to the speed of the vehicle is ultimately gated into counter 14 and onto individual counter chips 64, 66, 68 and 70. Once the number of pulses gated into counter 14 has been counted and placed on the data line to decoder/driver chips corresponding to the proper numerals for display, the information is available to be assimilated into the individual decoder/driver chips 78, 76, 74 and 72. Once data is sitting at the input lines to decoder/driver chips 78, 76, 74, and 72, the DDSTR signal goes to a high logic level for a single block pulse and then returns to a low logic level. As the DDSTR signal goes to a high logic level, data at the input lines to decoder/driver chips 78, 76, 74, and 72 is strobed into these chips. As this DDSTR signal returns to a low logic level, this information is latched into decoder/driver 22 and becomes fixed. This is the data that will ultimately be displayed by liquid crystal display optical system 24. Since decoder/driver chips 78, 76, 74, and 72 are linked directly to individual numerals of multi-segment liquid crystal display 80, the information will automatically be read out directly in decimal form. Because the data is latched into decoder/driver 22, the display will not flicker during update time, but will continue to display the latched information until replacement information is latched into decoder/driver 22.

Reset pulses which facilitate update cycles are actually generated in shift register 60 and appear at its output pin 10. Pin 10 of shift register 60 is coupled to pin 9 of each of counter chips 64, 66, 68, and 70. The reset pulses serve a dual function of resetting the individual chips of counter 14 and setting a high logic level at the input of a flip-flop 62. Flip-flop 62 is clocked by a master clock signal $\overline{MC}$, derived from pin 12 and pin 9 of divide by two counter 42 within divider 18. $\overline{MC}$ is an inverted master clock signal generated in oscillator 16. Each time the output of shift register 60 at pin 10 goes to a high logic level, the following low to high transition of $\overline{MC}$ sets a high logic level on the output of flip-flop 62. This signal is coupled to divider 44 and 46 and resets them. At the end of 0.73 seconds, data has been loaded into counter 14. Three master clock counts later, the data is strobed into decoder/driver 22 and latched. An additional two master clock counts later, counter 14 is reset for a new 0.73 second cycle, but decoder/driver 22 is not reset at this time. This allows data already latched into decoder/driver 22 to continuously be displayed. The information in decoder/driver 22 is reset approximately five ten-thousandths of a second later, thereby eliminating flicker on liquid crystals display 80. In terms of actual physical parameters, the display is updated at a rate which is plus or minus one mile per hour or less, depending upon whether the speed of the vehicle is held constant.

Display driver oscillator 26 includes gate 86, gate 84 and flip-flop 82. Liquid crystal displays must be driven by precise 50% duty cycle pulse train of thirty to one hundred and twenty hertz and within precise voltage limits. Gates 86 and 84 are of the same circuit format as is used in oscillator 16. The output of gate 86 at pin 10 is coupled to both inputs at pin 12 and 13 of gate 84. The output of gate 84 is fed back to the inputs of gate 86 at pins 8 and 9 through a coupling capacitor 85. A resistor couples the output of gate 86 back to its input. The output of gate 84 at pin 11 is coupled to pin 3 of flip-flop 82. Gates 86 and 84 combine to form a CMOS oscillator producing nonsymmetrical square waves incapable of driving a liquid crystal display. Liquid crystal displays driven by nonsymmetrical square waves cause a residual DC potential across the display which quickly destroys it. For this reason, flip-flop 82 is coupled to the output of gate 84 and functions as a divide by two counter. By dividing the output of gate 84 by two, a precise 50% duty cycle signal is established with no residual potential across display 80, thereby enhancing the life of the display.

Each of the four counter chips 64, 66, 68 and 70 are decimal counters, that is, they count from zero to nine and their four output lines carry information that is decimally coded. On the tenth count of each block, there is a carry-out which carries a pulse into the next significant figure counter. These carry-out lines run from pin 7 of one chip to pin 5 of the next. The use of four digits allows counting of speed to four significant figures. Depending upon the sampling rate selected, these four figures could correspond to from 0–9999 miles per hour or from 0–99.99 miles per hour.

Figure 3:
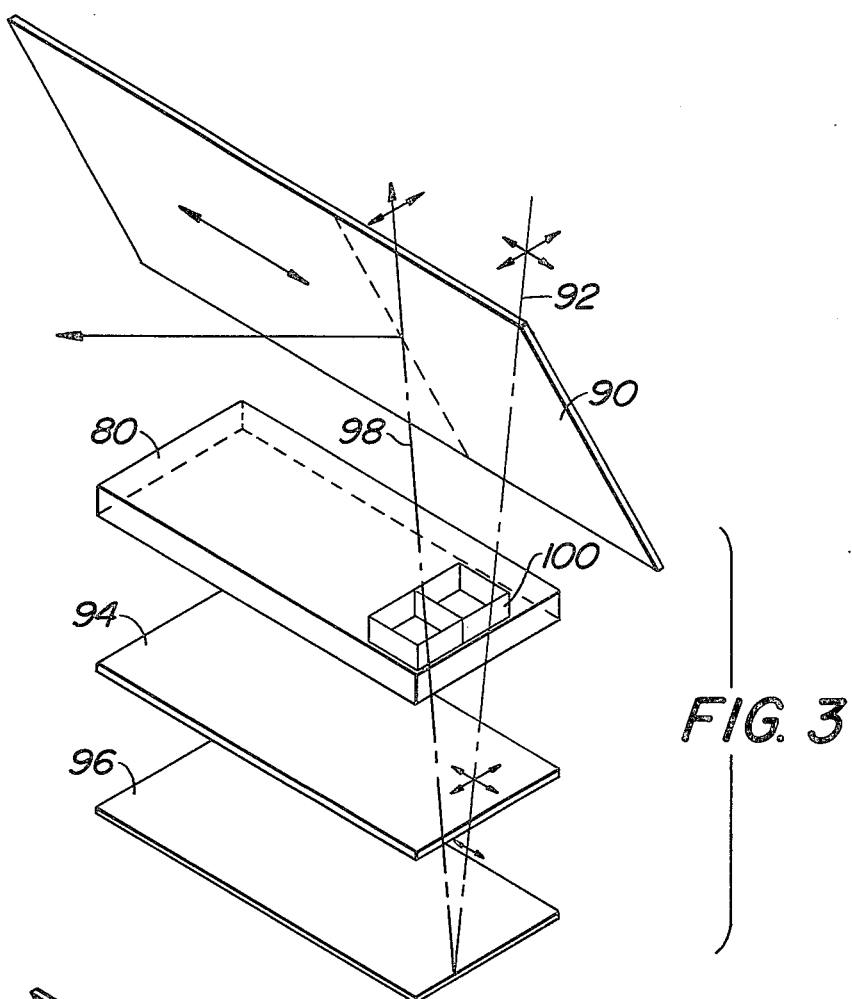
FIG. 3 is an exploded view of the liquid crystal display optical system.

Referring now to FIG. 3, the multi-segment liquid crystal display optical system is detailed. Optical system 24 is positioned adjacent the windshield 90 of a vehicle so that incident light 92 passes through windshield 90 and impinges upon it. Multi-segment liquid crystal display 80 is the heart of optical system 24. Operating in conjunction with the electrical encoding and energizing circuitry detailed schematically in FIG. 2, liquid crystal display 80 actually transforms the coded vehicle speed into numerical form. Positioned below liquid crystal display 80 is a polarizing filter element 94 positioned so that light passing through display 80 will also pass through the filter element. Directly below filter element 94 is a semi-transparent reflective tape element 96 which reflects incident light 92 passing through liquid crystal display 80 and polarizing filter element 94 in a substantially reverse path displacement. Reflected light 98 from semi-transparent reflective tape element 96 passes back through polarizing filter element 94 and again through liquid crystal display 80 and impinges upon windshield 90. Liquid crystal display 80 includes four separate and distinct numerals each having seven segments 100. Each segment 100 is coupled to at least one output of decoder/driver chip 78, 76, 74, or 72 of decoder/driver 22 and is either energized or unenergized depending upon the information stored in its associated chip or chips. Light 92 incident upon liquid crystal display 80 and then passing through polarizing filter element 94 and thereafter being reflected by semi-transparent reflective tape 96 back through the filter element and liquid crystal display will ultimately impinge upon windshield 90 and produce an image visible to the driver. To understand the formation of this image, it is necessary to consider the status of various segments of liquid crystal display 80. Depending upon the information stored in the decoder/driver chips associated with various segments 100, an individual segment will either be energized or unenergized.

Incident light 92 passing through windshield 90 from the outside is randomly polarized. Defining the "X" direction as being in the plane of the paper of FIG. 3 and defining the "Y" direction as being into and out of, i.e., normal to, the plane of the paper of FIG. 3, incident light 92 passing through windshield 90 will contain X and Y components of polarization. It is a characteristic of liquid crystal displays that energized segments will not impart a polarization twist to light passing through them. That is, light passing through an energized segment will maintain its polarization orientation. "Twist" is defined as causing a flip to occur between X and Y vector components of light polarization. Light passing through energized segments 100 will have the same X and Y vector components of polarization after passing through the segment as it had prior to passing through the segment. However, unenergized segments 100 cause a 90° polarization twist to occur for all light components passing through them. In other words, incident light 92 passing through an unenergized segment will have a polarization orientation that is 90° twisted after having passed through such an unenergized segment.

Polarizing filter element 94 is oriented such that it will block Y components of polarization and pass X components of polarization. Thus, components of light polarized in the Y direction will be filtered out completely. Only light components polarized in the X direction will pass through polarizing filter element 94 and impinge upon and be reflected from semi-transparent reflective tape element 96.

Reflection from semi-transparent reflective tape element 96 induces a 180° reflection so that there is no polarization phase reversal of light so reflected. Since only polarization components in the X direction were transmitted to semi-transparent reflective tape element 96, those are the only components that will be reflected from the tape back toward the filter element. Once again, reflected light 98 from semi-transparent reflective tape element 96 will easily pass through polarizing filter element 94 and then through liquid crystal display 80. Incident light 92 that originally passed through an energized segment and had no twist imparted to it will pass back through the same energized segment, but this time with only the X components remaining. No twist is imparted to reflected light 98. Reflected light 98 happens to be in the plane of windshield 90. Because reflected light 98 is now polarized and only light which is polarized in the plane of windshield 90 will be reflected from it, this light will be reflected to the observer. Windshield 90 acts as a remote polarizer, reflecting light in its own plane, thereby allowing the observer to see an energized segment of liquid crystal display 80.

The process is slightly different for unenergized segments 100. Incident light 92 passing through windshield 90 and having random polarization with both X and Y components, impinges upon an unenergized segment 100. As incident light 92 transmits through the unenergized segment 100, it will be twisted, i.e., X and Y vectors of polarization will be flipped. In other words, the unenergized segment imparts a 90° twist of rotation unto incident light 92 as it passes through unenergized segment 100. Light 92 that is transmitted through such a segment now has X and Y vectors flipped. Once again, polarizing filter element 98 will filter out what were originally the X components that are now 90° twisted and have become Y components. This filtering occurs because polarizing filter element 94 is oriented so that Y components are filtered out and X components are passed. Since a 90° twist occurred for light passing through an unenergized segment 100, what were originally X components are now Y components and are filtered, thereby being removed from the composite light passing through filter element 94. Incident light 92 having passed through an unenergized segment 100 and then through polarizing filter element 94 will contain only the original Y components, now in the X plane. These components are reflected by semi-transparent reflective tape element 96 with no phase reversal. Reflected light 98 coming back up through an unenergized segment 100 again becomes 90° rotationally twisted. This twist occurs for light passing through such an unenergized segment 100 in either direction. This is a characteristic of the molecular alignment of display segments 100. All Y components having passed through polarizing filter element 94, reflected from semi-transparent reflective tape element 96, and passing once through the polarizing filter element, once again pass through the unenergized segment through which they originally came. The effect of this passage through unenergized segment 100 is to twist the Y vector component back into its original plane. This Y vector component is now polarized at a 90° orientation to the plane of incidence of the windshield. The laws of optics dictate that polarized light at 90° rotation of the plane of incidence on a plane surface will be transmitted through that surface not reflected. Therefore, such light is transmitted back through windshield 90 and is not reflected to the observer. The observer will therefore not see unenergized segments. As a matter of fact, the observer will see darkness because there is no light reflected to him that has passed through an unenergized segment.

Figure 4:
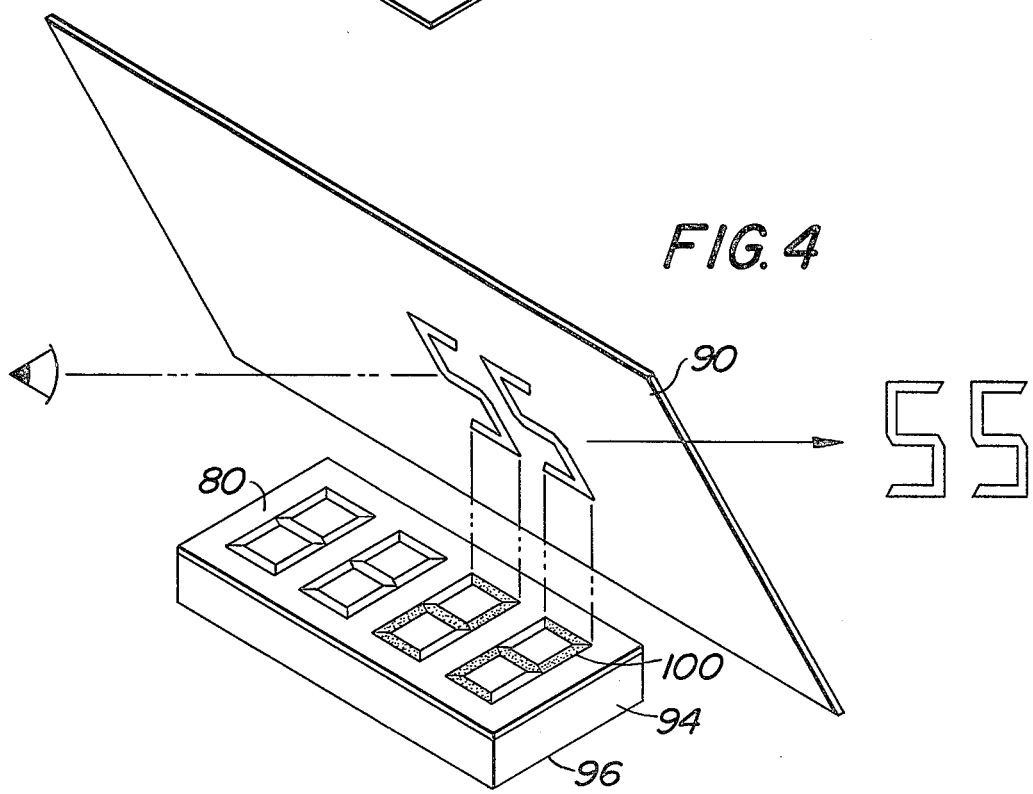
FIG. 4 is a diagrammatic view of the manner in which projected indicia will appear to the observer.

Referring now to FIG. 4 which is a diagrammatic representation of the manner in which projected indicia will appear to the observer, liquid crystal display optical system 24 is positioned below windshield 90. Liquid crystal display 80, polarizing filter element 94 and semi-reflective tape 96 are positioned tightly adjacent one another. As illustrated, segments corresponding to the numeral 55 are energized. Incident light passing through windshield 90 and then through the energized segments 100 are polarized, filtered, and then reflected. Reflected light 98 again passes through polarizing filter element 94 and through energized segments corresponding to the numerals 55. This reflected light impinges upon windshield 90 and is reflected to the observer because it is polarized in the plane of the windshield. The observer will view the numerals 55 having a characteristic color imparted by semi-transparent reflective tape 96.

Unenergized segments will not cause light to be reflected off of the windshield to the observer because there are no polarization components coincident with the plane of the windshield.

Prior methods for producing heads up display for windshields of both cars and airplanes have been forced to make use of high intensity cathode ray tubes or other radiation emitting devices. Other heads up display systems use elaborate back-lighting techniques or highly ineffective reflecting lighting. The windshield indicia display system, according to the present invention, makes use of the high contrast ratio of liquid crystal display segments. These have approximately a 25 to 1 contrast ratio. In other words, reflected light passing through energized segments will be brighter than radiation incident upon optical system 24. It does not matter how bright the ambient light external to the windshield, because there is no need to overcome it. In all other applications and methods for projecting on windshields, it is necessary to overcome background radiation in order to see the numerals being projected. Here, ambient light is overcome using polarization techniques.

As a side effect, the image reflected from windshield 90 to the observer is a more crisp and clear image than those observed using high intensity radiation of conventional systems. In most conventional displays, a double image will occur due to reflections off of the laminations of the windshield. Reflections will normally occur in almost equal proportion from all layers of lamination and glass, thereby causing a fuzzy image. This occurs because light impinging upon windshield 90 is partially reflected to the observer and partially transmitted through the glass. That portion of the light transmitted will be partially reflected from the first lamination layer and partially transmitted and so forth. This process will cause a multitude of slightly displaced images which upon combination yield a fuzzy composite to be viewed by the observer.

Using the polarizing techniques according to the present invention, however, all light that is polarized in the plane of windshield 90 will be reflected to the observer. No light will be transmitted to be later reflected by a second layer of glass or a lamination layer.

In order to use the optical system 24 at night, when there is no incident light 92 passing through windshield 90, a light source element (not shown) is included below semi-transparent reflective tape element 96. This light source element need not be very bright as it will only be utilized where there is little ambient light external to the windshield. Light eminating from this light source element will pass through semi-transparent reflective tape element 96 and then behave exactly as light incident upon the reflected tape in prior cases. Y components of polarization of this light will still be filtered by polarizing filter element 94 and polarization twists will be imparted by segments 100 of liquid crystal display 80. Light passing through energized segments will be reflected to the user upon impinging windshield 90.

Therefore, it is apparent that there has been provided a windshield indicia display system employing polarization techniques to take advantage of ambient light. The system is suitable for displaying the speed of an automobile directly upon its windshield so that the driver need not glance away from his field of view to observe his speed. Due to the high contrast ratio characteristic of liquid crystal displays, the system functions independently of the level of ambient light and does not require high intensity lumination to project images upon the windshield. Electronic measuring encoding and driving circuitry presents speed or other inidicia directly to a liquid crystal display in easily usable form to provide a relatively simple and effective system.

Obviously, other embodiments and modifications of the present invention will readily come to those of oridinary skill in the art, having the benefit of the teachings presented in the foregoing description and drawings. It is therefore to be understood that this invention is not to be limited thereto and that said modifications and embodiments are intended to be included within the scope of the appended claims.

I claim:

1. A windshield indicia display system comprising:
   multi-segment liquid crystal display means positionally located adjacent said windshield in a manner allowing external light to pass through said windshield for impingement upon and through said liquid crystal display means;
   a polarizing filter element located adjacent said liquid crystal display means, said light passing through said display means and said filter element being filtered; and,
   means for reflecting said light initially passing through said liquid crystal display means and said polarizing filter element in a substantially reversed path displacement, said reflected light passing through said polarizing filter element and said multi-segment liquid crystal display means for reflection from said windshield, said reflecting means and said polarizing filter element being positioned in substantially parallel plane relation each to the other.

2. The display system of claim 1 further including:
   a light source element located adjacent said polarizing filter element, said liquid crystal display means, and said reflecting means for generating light to pass through said polarizing filter element and said liquid crystal display means for impingement on said windshield.

3. The display system of claim 1 wherein said reflecting means includes a semi-transparent reflective tape element.

4. The display system of claim 2 wherein said reflecting means includes a semi-transparent reflective tape element positioned adjacent said polarizing filter element, said light source element being positioned with respect to said tape element such that light eminating from said light source element passes through said tape element, said polarizing filter element, and said liquid crystal display means.

5. The display system of claim 1 wherein said liquid crystal display means is of spiral construction wherein unenergized segments provide substantially 90° rotation of polarization and wherein energized segments provide substantially 0° rotation of polarization to light passing therethrough.

6. The display system of claim 1 wherein said multisegment liquid crystal display means includes electrical drive means for energizing said segments.

7. The display system of claim 6 wherein said electrical drive means includes means for electrically coding information to be displayed upon said windshield.

8. The system of claim 7 wherein said electrical coding means includes means for generating a stream of pulses, the frequency of which are a function of said information.

9. A windshield indicia display system comprising:
   multi-segment liquid crystal display means positionally located adjacent said windshield in a manner allowing external light to pass through said windshield for impingement upon and through said liquid crystal display means;
   means for reflecting said light passing through said liquid crystal display means in a substantially reverse path displacement, said reflecting means including a polarizing filter element for substantially blocking polarized light vector components in a first direction and transmitting polarized light vector components in a second direction; and,
   means for electrically energizing selected display segments in accordance with indicia to be displayed upon said windshield whereby said reflected light passing through said liquid crystal display will be polarized in accordance with said indicia.

10. The display system of claim 9 further including:
a light source element located adjacent said liquid crystal display means for generating light to pass through said liquid crystal display means for impingement on said windshield.

11. The display system of claim 9 further including a polarizing filter element adjacent said liquid crystal display.

12. The display system of claim 9 wherein said energizing means includes:
a display drive oscillator; and,
at least one liquid crystal driver.

13. The display system of claim 12 further including:
at least one decimal decoder coupled to said liquid crystal driver whereby indicia to be displayed are converted to appropriate decimal form and transmitted to said driver.

14. The display system of claim 13 wherein indicia to be displayed are supplied to said decimal decoder in binary form.

15. The display system of claim 13 wherein indicia to be displayed are supplied in binary coded demical form.

16. The display system of claim 9 further including:
means coupled to said energizing means for encoding in format compatible with said energizing means, indicia to be displayed upon said windshield.

17. The display system of claim 16 wherein:
said encoding means produces a signal having digital pulses related to the speed of a vehicle.

* * * * *